United States Patent
Chen et al.

(10) Patent No.: US 7,151,967 B2
(45) Date of Patent: Dec. 19, 2006

(54) MONITOR WITH ADJUSTABLE ANGLE AND OPERATING METHOD THEREOF

(75) Inventors: Min-Jye Chen, Miaoli (TW); Yun-Wen Liu, Pingjhen (TW); Ting-Hui Chih, Hualien (TW)

(73) Assignee: Benq Corporation, Taoyuan (TW)

( * ) Notice: Subject to any disclaimer, the term of this patent is extended or adjusted under 35 U.S.C. 154(b) by 255 days.

(21) Appl. No.: 10/888,879

(22) Filed: Jul. 9, 2004

(65) Prior Publication Data
US 2005/0027474 A1 Feb. 3, 2005

(30) Foreign Application Priority Data
Jul. 15, 2003 (TW) ................ 92119219 A

(51) Int. Cl.
G05B 19/18 (2006.01)
G09G 5/00 (2006.01)
(52) U.S. Cl. ............... 700/56; 700/62; 700/58; 345/156
(58) Field of Classification Search ............. 700/56, 700/58, 62, 243, 17; 345/156, 178
See application file for complete search history.

(56) References Cited

U.S. PATENT DOCUMENTS

| 5,250,888 | A | 10/1993 | Yu |
| 6,163,541 | A | 12/2000 | Casey et al. |
| 6,288,891 | B1* | 9/2001 | Hasegawa et al. ......... 361/681 |
| 6,348,928 | B1 | 2/2002 | Jeong |
| 6,853,387 | B1* | 2/2005 | Evanicky et al. .......... 345/690 |
| 7,032,184 | B1 | 4/2006 | Choi et al. |
| 2003/0142063 | A1* | 7/2003 | Wang et al. ............... 345/156 |
| 2003/0142064 | A1* | 7/2003 | Wang et al. ............... 345/156 |
| 2004/0051742 | A1* | 3/2004 | Lee et al. .................. 345/836 |

FOREIGN PATENT DOCUMENTS

| CN | 1257235 | 6/2000 |
| CN | 1277384 | 12/2000 |
| CN | 1281206 | 1/2001 |

OTHER PUBLICATIONS

China Office Action mailed Jul. 21, 2006.

* cited by examiner

*Primary Examiner*—Thomas Pham
(74) *Attorney, Agent, or Firm*—Thomas, Kayden, Horstemeyer & Risley

(57) ABSTRACT

A monitor with an adjustable angle and operating method thereof. The monitor includes a rotation component to control display angle, an OSD (On Screen Display) module, a microprocessor and a motor. The OSD module provides an interface from which a target angle can be selected, and the OSD module transmits a first control signal corresponding to the target angle to the microprocessor. The microprocessor transmits a second control signal corresponding to the first control signal to the motor. The motor drives the rotation component to automatically adjust angle of the monitor to the target angle according to the second control signal.

8 Claims, 5 Drawing Sheets

MONITOR WITH ADJUSTABLE ANGLE AND OPERATING METHOD THEREOF

BACKGROUND OF THE INVENTION

1. Field of the Invention

The present invention relates to a computer monitor and operating method thereof, and particularly to a monitor and operating method that records preset angles and adjusts its angle automatically.

2. Description of the Related Art

With the wide use of computer systems, specific functions are continuously developed for related use, thereby increasing the convenience of configuration and operation. For example, a monitor always integrates an OSD (On Screen Display) module providing an interface for users to set related monitor settings, such as brightness, contrast, color, position of displayed image, OSD position, and others.

Since monitor process may differ with manufacturer and users have differing requirements, display angle must be adjusted before use. In addition, if one monitor serves multiple users, it is inconvenient to repeatedly adjust the display angle.

SUMMARY OF THE INVENTION

It is therefore an object of the present invention to provide a monitor and operating method thereof that records angle settings automatically.

It is another object of the present invention to provide a monitor and operating method thereof that receives setting of preset angles of different users.

It is another object of the present invention to provide a monitor and operating method thereof that adjusts its angle automatically.

To achieve the above objects, the present invention provides a monitor and operating method thereof. The monitor according to the present invention includes a rotation component to control an adjustable angle of the monitor, an OSD (On Screen Display) module, a microprocessor and a motor. The OSD module provides an interface to select a target angle, and the OSD module transmits a first control signal correspondingly to the microprocessor. The microprocessor transmits a second control signal corresponding to the first control signal to the motor. The motor drives the rotation component to adjust the adjustable angle of the monitor to the target angle according to the second control signal.

In addition, the monitor further includes a sensor to detect a rotation signal of the rotation component, and transmit it to the microprocessor. The microprocessor calculates angle to be adjusted according to the rotation signal. The OSD module receives the adjusted angle from the microprocessor, sets the adjusted angle as a preset angle, and implements the adjusted angle. The sensor detects a rotation signal corresponding to an angle set by a user with the rotation component, and transmits it to the microprocessor, thereby updating the angle of the monitor.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
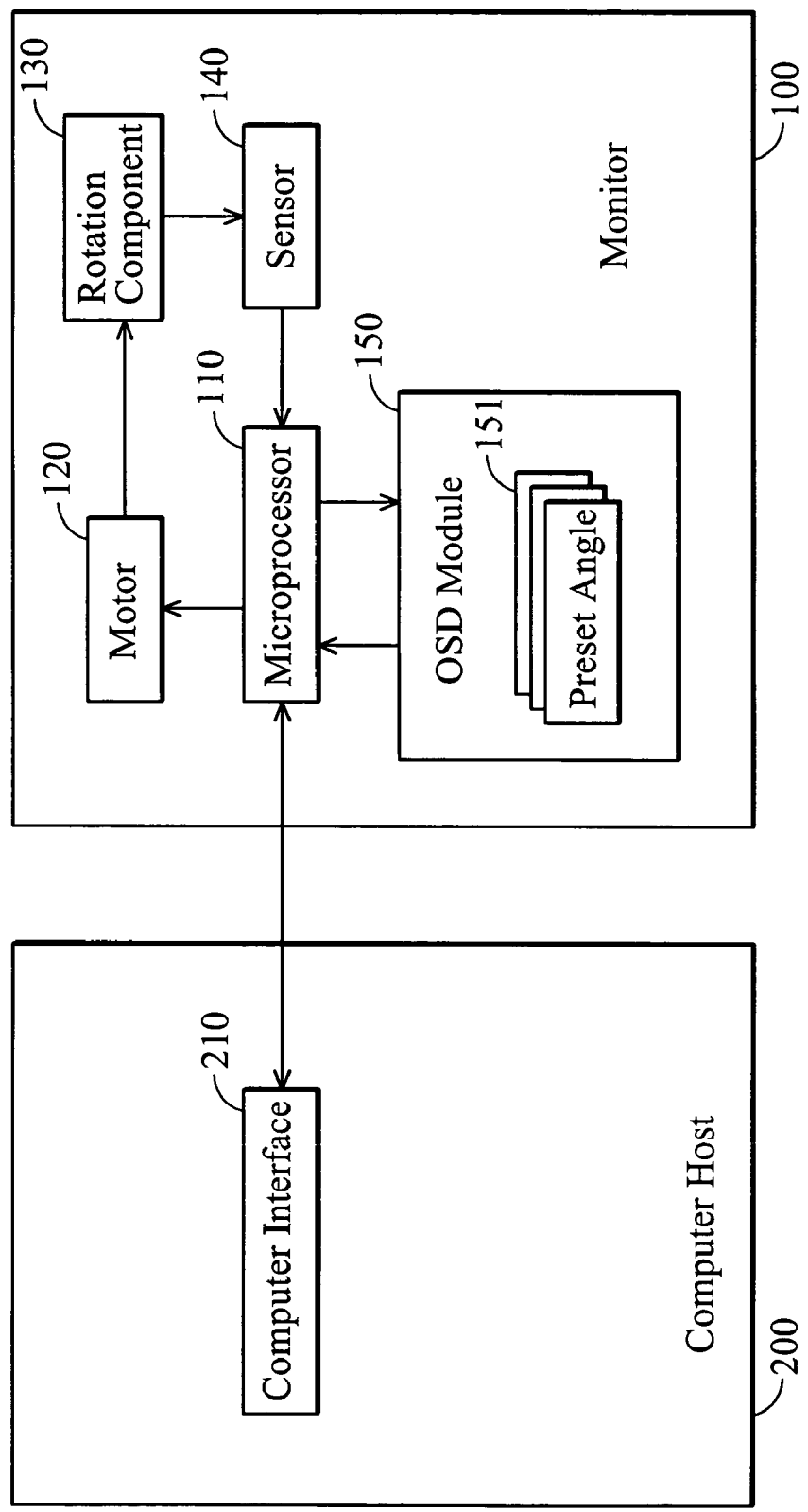
FIG. 1 is a schematic diagram illustrating the system architecture of a monitor with adjustable angle according to the present invention.

FIG. 1 illustrates the system architecture of the monitor with an adjustable angle according to the present invention.

Figure 2:
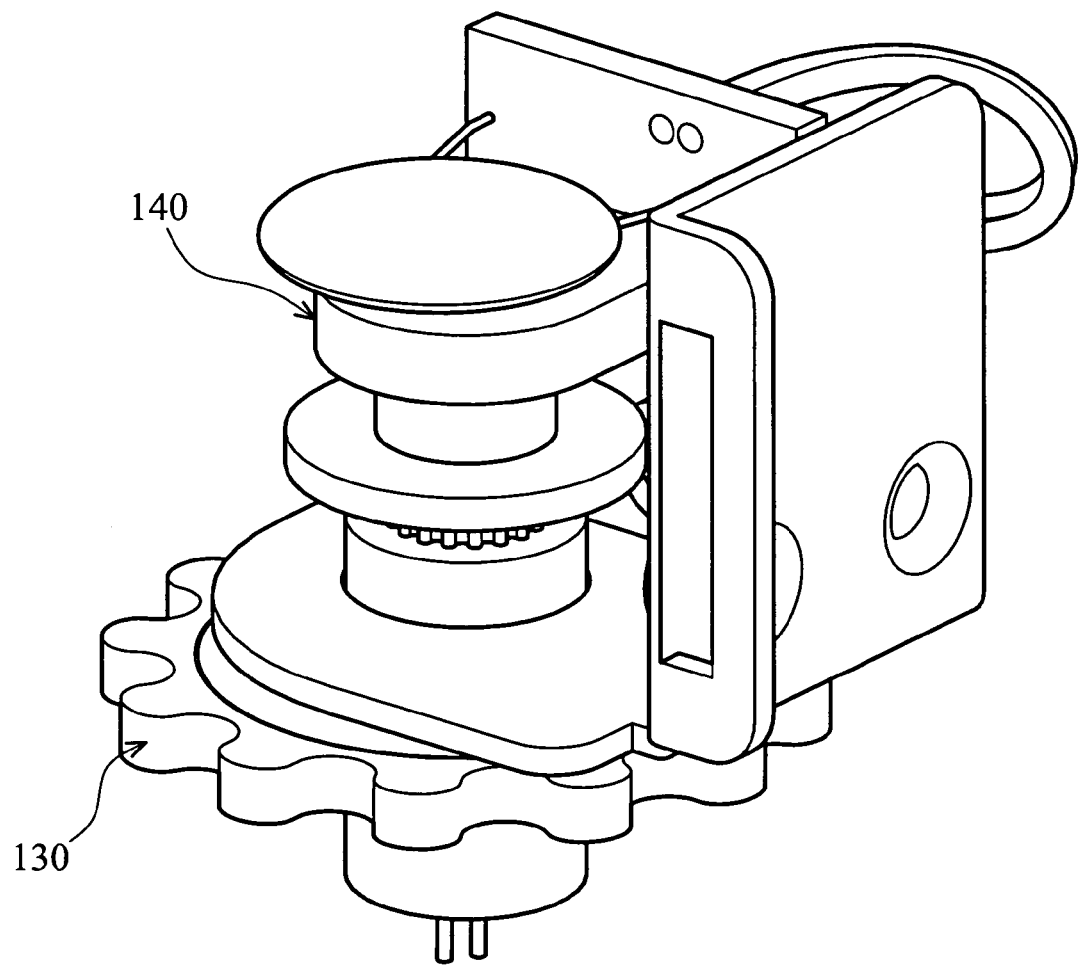
FIG. 2 is a schematic diagram illustrating an example of the rotation component and sensor according to the present invention.

The monitor 100 with the adjustable angle according to the present invention includes a microprocessor 110, a motor 120, a rotation component 130, a sensor 140 and an OSD (On Screen Display) module 150. The rotation component 130 may be a pivot connected to the panel of the monitor 100 to control the adjustable angle of the monitor 100. The microprocessor 110 has operating capability for functions provided by the monitor 100. The motor 120 receives a control signal from the microprocessor 110, and drives the rotation component 130 to adjust the adjustable angle of the monitor 100 to a target angle according to the control signal. The sensor 140 detects a rotation signal of the rotation component 130, and transmits it to the microprocessor 110. The microprocessor 110 may calculate the current angle of the monitor 100 according to the rotation signal. An example of the rotation component 130 and sensor 140 is illustrated in FIG. 2. The rotation component 130 may couple to the gear fixing the panel of the monitor 100 to control the adjustable angle of the monitor 100, and the sensor 140 may detect the rotation signal generated by the rotation component 130.

The OSD module 150 includes related software, firmware and circuits for OSD functions provided by the monitor 100. The OSD module 150 stores preset angles corresponding to different users when operating the monitor 100. In addition, a computer host 200 includes a computer interface 210. Users may set a target angle by using the computer interface 210, and the monitor 100 can be automatically adjusted to the target angle by the microprocessor 110 via the computer interface 210. Operations between the microprocessor 110, motor 120, rotation component 130, sensor 140 and OSD module 150 of the monitor 100 and the computer interface 210 are discussed as follows.

Figure 3:
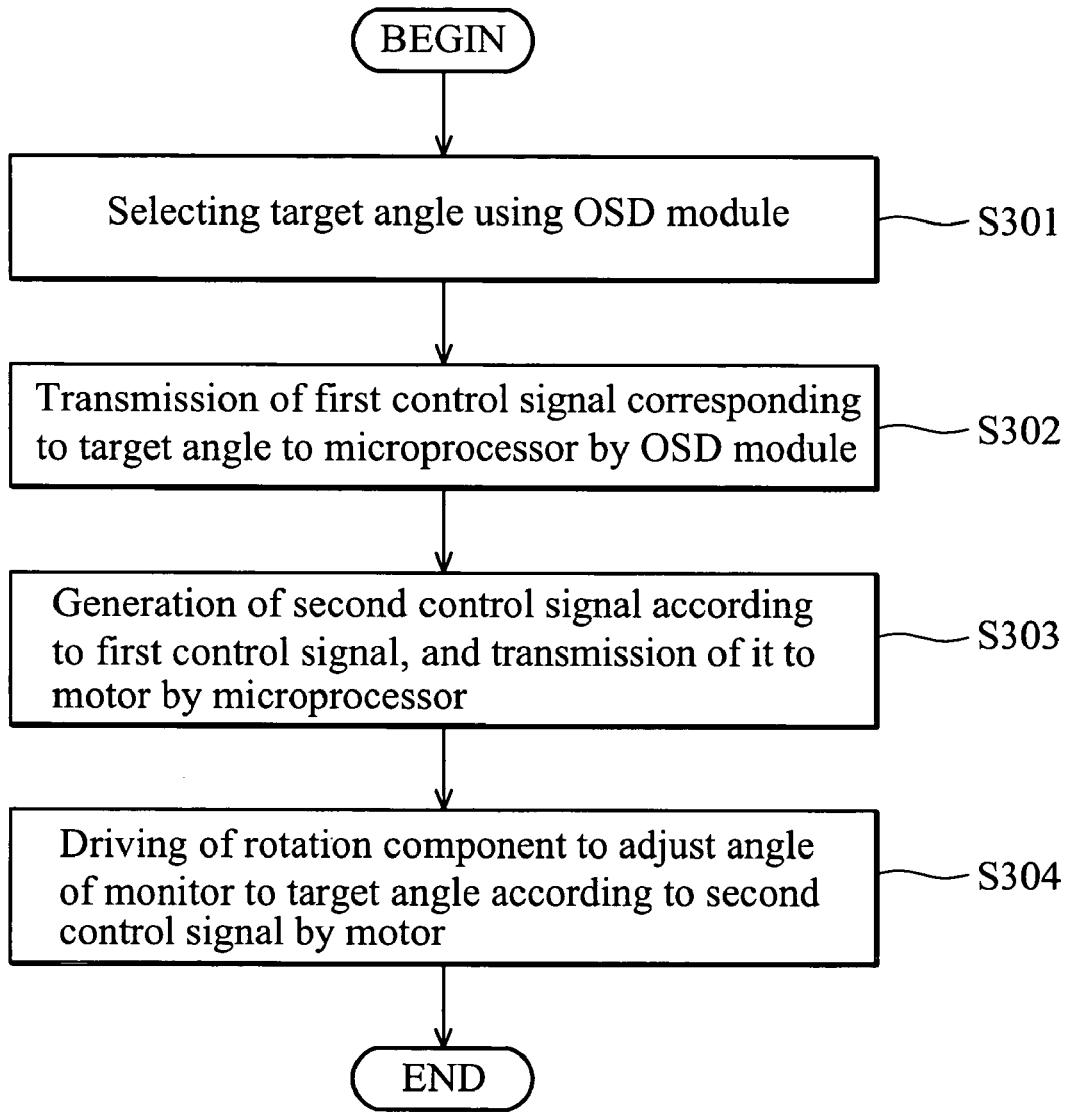
FIG. 3 is a flowchart showing the process of automatic angle adjustment using the OSD module according to the present invention.

FIG. 3 shows the process of automatic angle adjustment using the OSD module 150 according to the present invention. First, in step S301, the OSD module 150 allows selection or setting of the target angle. Then, in step S302, the OSD module 150 transmits a first control signal corresponding to the target angle to the microprocessor 110. Thereafter, in step S303, the microprocessor 110 generates a second control signal according to the first control signal, and transmits it to the motor 120. After the motor 120 receives the second control signal, in step S304, it drives the rotation component 130 to adjust the adjustable angle of the monitor 100 to the target angle according to the second control signal.

It should be noted that the OSD module 150 may record a preset angle 151 corresponding to different users. Each user can select a corresponding preset angle 151 by using the OSD module 150, then, the angle of the monitor 100 can be adjusted automatically via the OSD module 150, microprocessor 110, motor 120 and rotation component 130, in which the related operations are similar to those in FIG. 3, and omitted here.

Figure 4:
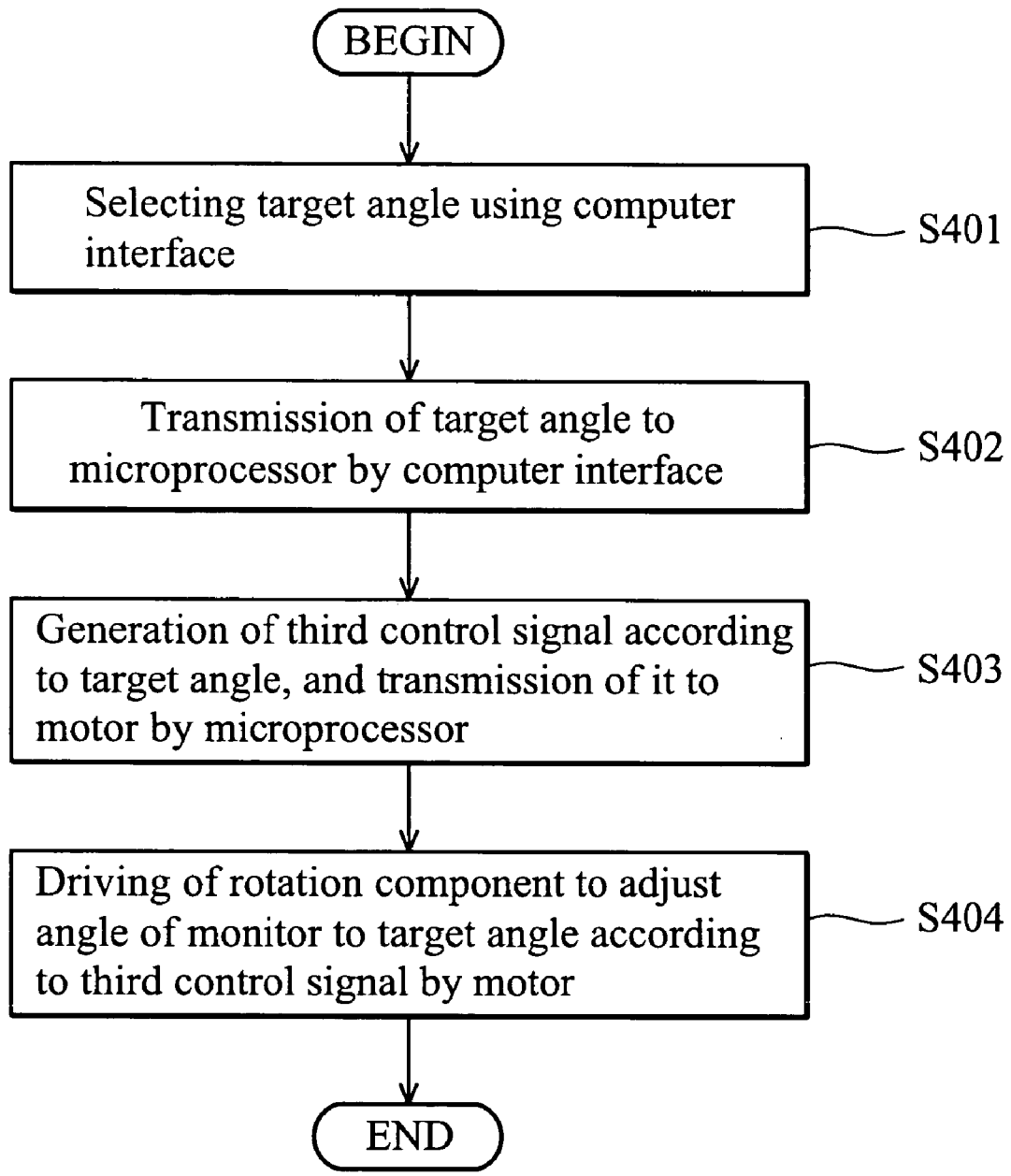
FIG. 4 is a flowchart showing the process of automatic angle adjustment using a computer interface according to the present invention.

FIG. 4 shows the process of automatic angle adjustment using the computer interface 210 according to the present invention. First, in step S401, computer interface 210 is used to set the target angle. Then, in step S402, the computer interface 210 transmits the target angle to the microprocessor 110 of the monitor 100. Thereafter, in step S403, the microprocessor 110 generates a third control signal according to the target angle, and transmits it to the motor 120. After the motor 120 receives the third control signal, in step S404, it drives the rotation component 130 to adjust the adjustable angle of the monitor 100 to the target angle accordingly.

Figure 5:
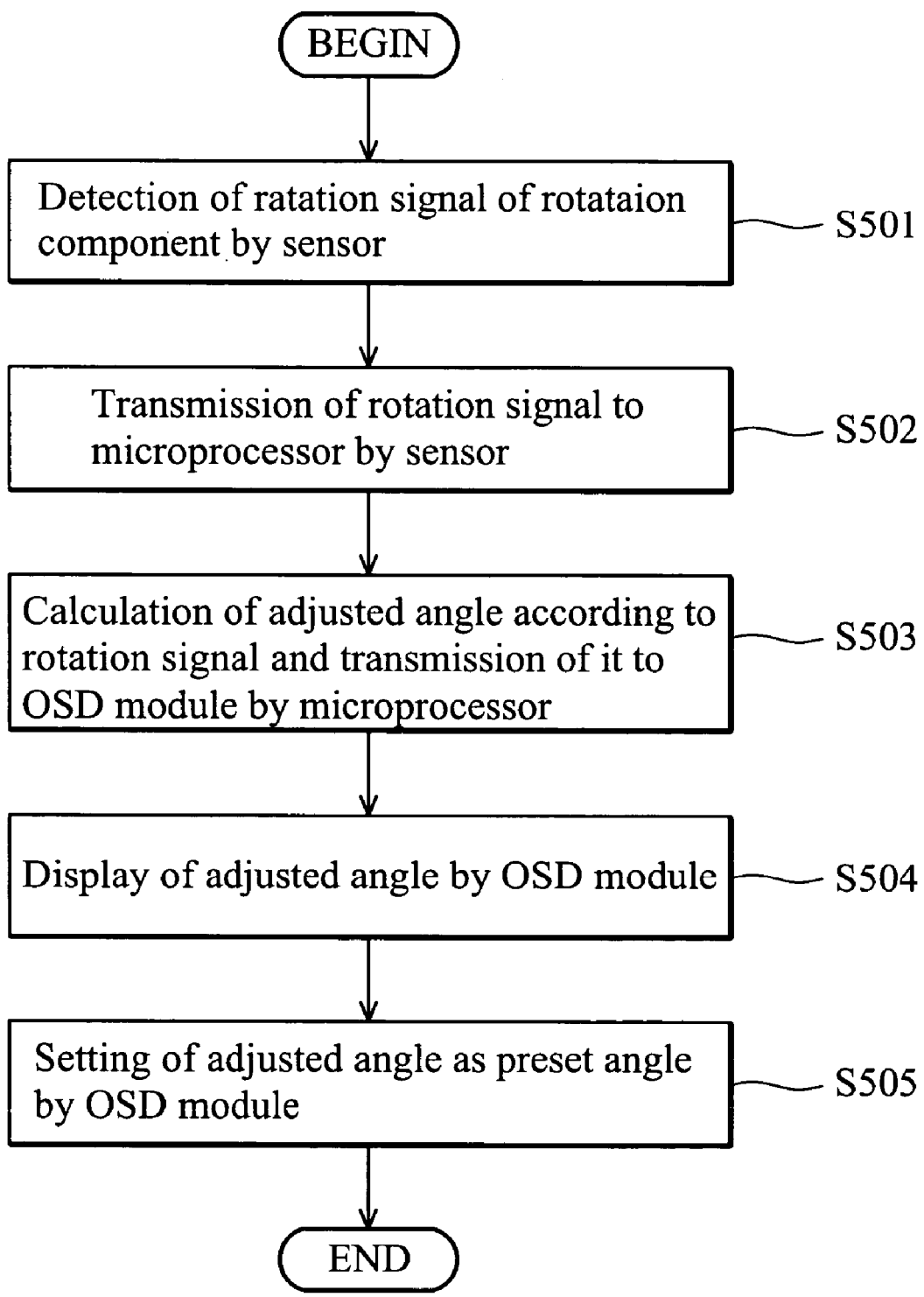
FIG. 5 is a flowchart showing the process of angle detection according to the present invention.

FIG. 5 shows the process of angle detection according to the present invention. First, in step S501, the sensor 140 detects any rotation of the rotation component 130, and in step S502, transmits the rotation signal to the microprocessor 110. Then, in step S503, the microprocessor 110 calculates a post adjusted angle according to the rotation signal, and transmits it to the OSD module 150. Thereafter, in step S504, the OSD module 150 displays the post-adjusted angle received from the microprocessor 110. The post-adjusted angle is set as a preset angle, and in step S505.

It also should be noted that, in addition to automatic angle adjustment via the motor 120, the target angle can be adjusted by further manual adjustment of the rotation component 130. In this case, the sensor 140 may detect the rotation signal corresponding to the target angle of the rotation component 130, and transmit it to the microprocessor 110. If an angle 151 is preset in the OSD module 150, the preset angle 151 can be updated by the angle calculated by the microprocessor 110 according to the rotation signal.

As a result, using the monitor with adjustable angle and operating method thereof according to the present invention, angle of the monitor can be detected and recorded automatically. In addition, corresponding preset angles can be preset in the OSD module, and angle of the monitor can be automatically adjusted via selection from the preset angles or setting target angles, thereby increasing convenience.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A monitor with an adjustable angle, comprising:
   a rotation component to control the adjustable angle of the monitor;
   an OSD (On Screen Display) module to provide an interface from which to select a first target angle, and generate a first control signal corresponding to the first target angle;
   a microprocessor coupled to the OSD module to receive the first control signal, and generate a second control signal corresponding to the first control signal;
   a motor coupled to the microprocessor and the rotation component to receive the second control signal from the microprocessor, and drive the rotation component to adjust the adjustable angle of the monitor to the first target angle according to the second control signal; and
   a sensor to detect a first rotation signal of the rotation component and transmit it to the microprocessor, the microprocessor calculates a first post-adjusted angle according to the first rotation signal, the OSD module receives the first post-adjusted angle from the microprocessor, and sets the first post-adjusted angle as a first preset angle, and the sensor further detects a second rotation signal corresponding to any manual adjustment of a second target angle of the rotation component, and transmits it to the microprocessor, and the microprocessor calculates a second post-adjusted angle according to the second rotation signal, and transmits it to the OSD module to update the first preset angle.

2. The monitor as claimed in claim 1 wherein the OSD module further displays the first post-adjusted angle.

3. The monitor as claimed in claim 1 wherein the OSD module further records a second preset angle.

4. The monitor as claimed in claim 1 further comprising a computer interface from which to set a third target angle, and transmit it to the microprocessor, the microprocessor transmitting a third control signal corresponding to the third target angle to the motor, and the motor driving the rotation component to adjust the adjustable angle of the monitor to the third target angle according to the third control signal.

5. An operating method for a monitor including a rotation component to control an adjustable angle of the monitor, comprising the steps of:
   providing an OSD (On Screen Display) module to provide an interface from which a first target angle can be selected, generating a first control signal corresponding to the first target angle;
   providing a microprocessor coupled to the OSD module to receive the first control signal, generating a second control signal corresponding to the first control signal;
   providing a motor coupled to the microprocessor and the rotation component to receive the second control signal from the microprocessor, and drive the rotation component to adjust the adjustable angle of the monitor to the first target angle according to the second control signal;
   providing a sensor to detect a first rotation signal from the rotation component, transmission thereof to the microprocessor, and calculation of a first post-adjusted angle according to the first rotation signal by the microprocessor;
   reception of the first adjusted angle from the microprocessor by the OSD module, and setting of the first post-adjusted angle as a first preset angle; and
   detection of a second rotation signal corresponding to any manual adjustment of a second target angle of the rotation component by the sensor, transmission thereof to the microprocessor, and calculation of a second post-adjusted angle according to the second rotation signal by the microprocessor, and transmitting it to the OSD module to update the first preset angle.

6. The operating method as claimed in claim 5 further comprising display of the first adjusted angle by the OSD module.

7. The operating method as claimed in claim 5 further comprising recording of a second preset angle by the OSD module.

8. The operating method as claimed in claim 5 further comprising providing a computer interface from which a third target angle can be set, transmission thereof to the microprocessor, transmission of a third control signal corresponding to the third target angle to the motor by the microprocessor, and direction to the rotation component to adjust display angle to the third target angle according to the third control signal by the motor.

* * * * *